(12) United States Patent
Arakawa

(10) Patent No.: US 7,112,814 B2
(45) Date of Patent: Sep. 26, 2006

(54) METHOD AND APPARATUS FOR RECORDING AND READING OUT RADIATION IMAGES

(75) Inventor: Satoshi Arakawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 765 days.

(21) Appl. No.: 09/943,355

(22) Filed: Aug. 31, 2001

(65) Prior Publication Data

US 2002/0024032 A1    Feb. 28, 2002

(30) Foreign Application Priority Data

Aug. 31, 2000   (JP)   ............................... 2000-263897

(51) Int. Cl.
*G03B 42/08*   (2006.01)
(52) U.S. Cl. ..................................... 250/588
(58) Field of Classification Search ................. 250/588
See application file for complete search history.

(56) References Cited

U.S. PATENT DOCUMENTS

| | | | | |
|---|---|---|---|---|
| 4,543,479 A | | 9/1985 | Kato ........................ | 250/327.2 |
| 4,767,927 A | * | 8/1988 | Ohyama et al. ............. | 250/585 |
| 4,814,616 A | * | 3/1989 | Saotome ..................... | 250/588 |
| 4,816,679 A | | 3/1989 | Sunagawa et al. ......... | 250/327.2 |
| 4,849,630 A | * | 7/1989 | Fukai et al. ................. | 250/588 |
| 4,851,679 A | | 7/1989 | Tamura et al. ............ | 250/327.2 |
| 4,883,961 A | | 11/1989 | Arakawa et al. ......... | 250/327.2 |
| 4,922,103 A | | 5/1990 | Kawajiri et al. ......... | 250/327.2 |
| 5,115,132 A | * | 5/1992 | Saotome et al. ............ | 250/590 |
| 6,072,855 A | * | 6/2000 | Arakawa .................... | 250/588 |

FOREIGN PATENT DOCUMENTS

| | | |
|---|---|---|
| JP | 60-111568 | 6/1985 |
| JP | 60-236354 | 11/1985 |
| JP | 63-189855 | 8/1988 |
| JP | 1-101540 | 4/1989 |
| JP | 3-238441 | 10/1991 |
| JP | 11038533 A * | 2/1999 |

OTHER PUBLICATIONS

Abstract 01-101540, Apr. 19, 1989.

* cited by examiner

*Primary Examiner*—Constantine Hannaher
(74) *Attorney, Agent, or Firm*—Sughrue Mion, PLLC

(57) ABSTRACT

One surface of a stimulable phosphor sheet supported at a position for image recording is exposed to radiation, and a radiation image is stored on the stimulable phosphor sheet. Image readout is performed from the side of the other surface of the stimulable phosphor sheet supported at the position for image recording. Energy remaining on the stimulable phosphor sheet is then released by irradiating erasing light to an entire area of the stimulable phosphor sheet with a sheet-shaped erasing light source, which has uniform transmissivity to radiation and is located close to the one surface of the stimulable phosphor sheet supported at the position for image recording.

18 Claims, 6 Drawing Sheets

METHOD AND APPARATUS FOR RECORDING AND READING OUT RADIATION IMAGES

BACKGROUND OF THE INVENTION

1. Field of the Invention

This invention relates to a radiation image recording and read-out method and apparatus, wherein a radiation image is stored on a stimulable phosphor sheet, the stimulable phosphor sheet, on which the radiation image has been stored, is exposed to stimulating rays, which cause the stimulable phosphor sheet to emit light in proportion to the amount of energy stored thereon during its exposure to radiation, the emitted light is detected, and the radiation image is thereby read out from the stimulable phosphor sheet and converted into an electric signal. This invention particularly relates to an improvement in an erasing light source.

2. Description of the Related Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material. The radiation image recording and reproducing systems described above are referred to as computed radiography (CR).

The applicant proposed built-in types of radiation image recording and read-out apparatuses, comprising: (i) circulation and conveyance means for conveying at least one stimulable phosphor sheet along a circulation path, (ii) an image recording section, which is located in the circulation path and in which a radiation image of an object is stored on the stimulable phosphor sheet, (iii) an image read-out section, which is located in the circulation path and in which the radiation image is read out from the stimulable phosphor sheet, and (iv) an erasing section, which is located in the circulation path and in which energy remaining on the stimulable phosphor sheet after the radiation image has been read out therefrom is released. The built-in types of radiation image recording and read-out apparatuses are disclosed in, for example, U.S. Pat. Nos. 4,543,479 and 4,851,679, and Japanese Unexamined Patent Publication No. 3(1991)-238441. With the proposed built-in types of radiation image recording and read-out apparatuses, the stimulable phosphor sheet is utilized repeatedly and is processed efficiently.

As for the radiation image recording and read-out apparatuses described above, from the point of view of keeping the emitted light detection time short, reducing the size of the apparatus, and keeping the cost low, it has been proposed to utilize a line sensor comprising a charge coupled device (CCD) image sensor, or the like, as photoelectric read-out means. The utilization of the line sensor as the photoelectric read-out means is disclosed in, for example, Japanese Unexamined Patent Publication Nos. 60(1985)-111568, 60(1985)-236354, and 1(1989)-101540.

Basically, the radiation image recording and read-out apparatuses of such types comprise:

i) a read-out unit comprising (a) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, and (b) a line sensor, which comprises a plurality of photoelectric conversion devices arrayed along the linear area of the stimulable phosphor sheet exposed to the linear stimulating rays, and ii) sub-scanning means for moving the stimulable phosphor sheet with respect to the read-out unit and in a direction (a sub-scanning direction), which is approximately normal to a length direction of the linear area of the stimulable phosphor sheet exposed to the linear stimulating rays (a main scanning direction).

In particular, in cases where the radiation image recording and read-out apparatuses are constituted such that the stimulable phosphor sheet is kept stationary, and the read-out unit is moved in the sub-scanning direction, the sizes of the radiation image recording and read-out apparatuses as a whole are capable of being kept small. As an example of the radiation image recording and read-out apparatus having the constitution described above, in order for energy, which remains on the stimulable phosphor sheet after the radiation image has been read out from the stimulable phosphor sheet, to be released, there has heretofore been proposed a radiation image recording and read-out apparatus, wherein an erasing light source is located on the side backward from the read-out unit, and erasing light is irradiated simultaneously to the entire surface of the stimulable phosphor sheet. As a different example of the radiation image recording and read-out apparatus having the constitution described above, in order for energy, which remains on the stimulable phosphor sheet after the radiation image has been read out from the stimulable phosphor sheet, to be released, there has heretofore been proposed a radiation image recording and read-out apparatus, wherein an erasing light source is located within the read-out unit, and the read-out unit is moved in order to irradiate erasing light successively to the entire surface of the stimulable phosphor sheet. The examples of the radiation image recording and read-out apparatuses described above are proposed in, for example, Japanese Unexamined Patent Publication No. 63(1988)-189855.

However, with the proposed radiation image recording and read-out apparatus, wherein the erasing light source is located on the side backward from the read-out unit, and the erasing light is irradiated simultaneously to the entire surface of the stimulable phosphor sheet in order to release energy remaining on the stimulable phosphor sheet, the read-out unit located between the stimulable phosphor sheet and the erasing light source intercepts the erasing light.

Therefore, the problems occur in that the erasing light cannot be uniformly irradiated to the entire surface of the stimulable phosphor sheet.

With the proposed radiation image recording and read-out apparatus, wherein the erasing light source is located within the read-out unit, and the read-out unit is moved in order to irradiate the erasing light successively to the entire surface of the stimulable phosphor sheet, both the image read-out means and the erasing light source are accommodated within the read-out unit. Therefore, the problems occur in that the constitution of the read-out unit cannot be kept simple, and the size of the read-out unit cannot be kept small.

SUMMARY OF THE INVENTION

The primary object of the present invention is to provide a radiation image recording and read-out method, which is capable of being performed with an apparatus having a small size as a whole, and in which an erasing light source need not be moved.

Another object of the present invention is to provide an apparatus for carrying out the radiation image recording and read-out method.

The present invention provides a radiation image recording and read-out method, comprising the steps of:

i) supporting a stimulable phosphor sheet at a position for image recording, at which one surface of the stimulable phosphor sheet is exposed to radiation, ii) exposing the one surface of the stimulable phosphor sheet, which is supported at the position for image recording, to the radiation, a radiation image being thereby stored on the stimulable phosphor sheet, iii) performing an image read-out operation from a side of the other surface of the stimulable phosphor sheet supported at the position for image recording, which other surface is opposite to the one surface of the stimulable phosphor sheet exposed to the radiation, the image read-out operation being performed by irradiating stimulating rays in two-dimensional directions to the stimulable phosphor sheet, on which the radiation image has been stored during its exposure to the radiation, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and iv) releasing energy, which remains on the stimulable phosphor sheet after the image signal has been obtained from the stimulable phosphor sheet, by irradiating erasing light to an entire area of the stimulable phosphor sheet with a sheet-shaped erasing light source, the sheet-shaped erasing light source being located in close vicinity to the stimulable phosphor sheet and on a side of the one surface of the stimulable phosphor sheet supported at the position for image recording, which one surface is exposed to the radiation, the sheet-shaped erasing light source having uniform transmissivity to the radiation.

The irradiation of the stimulating rays in two-dimensional directions to the stimulable phosphor sheet, on which the radiation image has been stored, may be performed in one of various ways. For example, one light beam of the stimulating rays may be deflected in the main scanning direction and the sub-scanning direction, and the stimulable phosphor sheet may be scanned with the light spot of the light beam in two-dimensional directions. Alternatively, one light beam of the stimulating rays may be deflected in the main scanning direction alone and may be moved with respect to the stimulable phosphor sheet in the sub-scanning direction. As another alternative, the stimulating rays may be irradiated linearly to an area on the stimulable phosphor sheet along the main scanning direction, the linear stimulating rays may be moved in the sub-scanning direction, and the stimulable phosphor sheet may thereby be scanned with the stimulating rays in two-dimensional directions. As a further alternative, the stimulating rays may be irradiated simultaneously to the entire area of the stimulable phosphor sheet.

The term "sheet-shaped erasing light source having uniform transmissivity to radiation" as used herein means that the sheet-shaped erasing light source is substantially free from a structure, which is discontinuous with respect to the transmissivity to the radiation. Specifically, the sheet-shaped erasing light source has uniform transmissivity to the radiation such that, when the radiation carrying image information passes through the sheet-shaped erasing light source, the structure of the sheet-shaped erasing light source is not recorded as a gray level image pattern on the stimulable phosphor sheet, and such that the sheet-shaped erasing light source is capable of transmitting the radiation sufficiently for the image information carried by the radiation to be stored on the stimulable phosphor sheet. The transmissivity of the sheet-shaped erasing light source with respect to the radiation should preferably be as high as possible.

In the radiation image recording and read-out method in accordance with the present invention, the sheet-shaped erasing light source may comprise an organic electroluminescence device. Alternatively, the sheet-shaped erasing light source may comprise a transparent sheet, which has light diffusing properties, the transparent sheet being capable of radiating out the erasing light from a surface, which stands facing the stimulable phosphor sheet, toward the stimulable phosphor sheet, and light sources, each of which is located at one of two ends of the transparent sheet and produces the erasing light such that the erasing light enters from the one end of the transparent sheet into the transparent sheet.

In order for the transparent sheet to be imparted with the light diffusing properties, at least either one of two surfaces of the transparent sheet may be formed as a light diffusing surface. Alternatively, the transparent sheet may contain light diffusing particles dispersed therein.

Also, the radiation image recording and read-out method in accordance with the present invention may be modified such that the stimulable phosphor sheet comprises a sheet-shaped transparent substrate and a stimulable phosphor layer overlaid on the sheet-shaped transparent substrate, and the transparent sheet of the sheet-shaped erasing light source acts also as the sheet-shaped transparent substrate of the stimulable phosphor sheet.

Further, in the radiation image recording and read-out method in accordance with the present invention, the stimulable phosphor sheet may be kept stationary at the position for image recording, and the image read-out operation (i.e., the irradiation of the stimulating rays to the stimulable phosphor sheet and the detection of the light emitted by the stimulable phosphor sheet) may thereby be performed. Alternatively, after the radiation image has been recorded on the stimulable phosphor sheet, the stimulable phosphor sheet, on which the radiation image has been stored, may be conveyed by conveyance means to an image read-out section, and the image read-out operation may be performed in the image read-out section. In particular, the radiation image recording and read-out method in accordance with the present invention should preferably be modified such that the stimulable phosphor sheet is kept stationary at the position for image recording, and the image read-out operation is performed with a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, the read-out unit being moved in a sub-scanning direction.

The sub-scanning direction is the direction intersecting with the main scanning direction. In cases where the read-out unit irradiates the stimulating rays to the stimulable phosphor sheet in the one-dimensional direction along the main scanning direction and is moved in the sub-scanning direction, the stimulating rays are irradiated to the stimulable phosphor sheet in two-dimensional directions. Ordinarily, the sub-scanning direction is normal to the main scanning direction.

The read-out unit should preferably comprise a linear stimulating ray source, which linearly irradiates the stimulating rays to an area of the stimulable phosphor sheet, and a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

The present invention also provides an apparatus for carrying out the radiation image recording and read-out method in accordance with the present invention. Specifically, the present invention also provides a radiation image recording and read-out apparatus, comprising:

i) an image recording section for supporting a stimulable phosphor sheet at a position for image recording, at which one surface of the stimulable phosphor sheet is exposed to radiation, ii) image read-out means located on a side of the other surface of the stimulable phosphor sheet supported at the position for image recording, which other surface is opposite to the one surface of the stimulable phosphor sheet exposed to the radiation, the image read-out means performing an image read-out operation by irradiating stimulating rays in two-dimensional directions to the stimulable phosphor sheet, on which a radiation image has been stored during its exposure to the radiation, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and iii) a sheet-shaped erasing light source located in close vicinity to the stimulable phosphor sheet and on a side of the one surface of the stimulable phosphor sheet supported at the position for image recording, which one surface is exposed to the radiation, the sheet-shaped erasing light source having uniform transmissivity to the radiation, the sheet-shaped erasing light source releasing energy, which remains on the stimulable phosphor sheet after the image signal has been obtained from the stimulable phosphor sheet, by irradiating erasing light to an entire area of the stimulable phosphor sheet.

In the radiation image recording and read-out apparatus in accordance with the present invention, the sheet-shaped erasing light source may comprise an organic electroluminescence device. Alternatively, the sheet-shaped erasing light source may comprise a transparent sheet, which has light diffusing properties, the transparent sheet being capable of radiating out the erasing light from a surface, which stands facing the stimulable phosphor sheet, toward the stimulable phosphor sheet, and light sources, each of which is located at one of two ends of the transparent sheet and produces the erasing light such that the erasing light enters from the one end of the transparent sheet into the transparent sheet.

In order for the transparent sheet to be imparted with the light diffusing properties, at least either one of two surfaces of the transparent sheet may be formed as a light diffusing surface. Alternatively, the transparent sheet may contain light diffusing particles dispersed therein.

Also, the radiation image recording and read-out apparatus in accordance with the present invention may be modified such that the stimulable phosphor sheet comprises a sheet-shaped transparent substrate and a stimulable phosphor layer overlaid on the sheet-shaped transparent substrate, and the transparent sheet of the sheet-shaped erasing light source acts also as the sheet-shaped transparent substrate of the stimulable phosphor sheet.

Further, in the radiation image recording and read-out apparatus in accordance with the present invention, the stimulable phosphor sheet may be kept stationary at the position for image recording, and the image read-out operation (i.e., the irradiation of the stimulating rays to the stimulable phosphor sheet and the detection of the light emitted by the stimulable phosphor sheet) may thereby be performed. Alternatively, after the radiation image has been recorded on the stimulable phosphor sheet, the stimulable phosphor sheet, on which the radiation image has been stored, may be conveyed by conveyance means to an image read-out section, and the image read-out operation may be performed in the image read-out section. In particular, the radiation image recording and read-out apparatus in accordance with the present invention should preferably be modified such that the stimulable phosphor sheet is kept stationary at the position for image recording, and the image read-out means comprises:

a) a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, and b) unit moving means for moving the read-out unit in a sub-scanning direction.

In such cases, the read-out unit should preferably comprise a linear stimulating ray source, which linearly irradiates the stimulating rays to an area of the stimulable phosphor sheet, and a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

With the radiation image recording and read-out method and apparatus in accordance with the present invention, as the erasing light source for releasing energy, which remains on the stimulable phosphor sheet after the image signal has been obtained from the stimulable phosphor sheet, the sheet-shaped erasing light source is employed. The sheet-shaped erasing light source is located in close vicinity to the stimulable phosphor sheet and on the side of the one surface of the stimulable phosphor sheet supported at the position for image recording, which one surface is exposed to the radiation. Also, the sheet-shaped erasing light source has uniform transmissivity to the radiation. Since the erasing light source has the sheet-like shape, a large space is not required for installing the erasing light source. Also, a mechanism for moving the erasing light source need not be provided. Therefore, the size of the radiation image recording and read-out apparatus as a whole is capable of being kept small, and the structure of the radiation image recording and read-out apparatus is capable of being kept simple.

Also, with the radiation image recording and read-out method and apparatus in accordance with the present invention, the stimulable phosphor sheet may be kept stationary at the position for image recording, and the image read-out operation may be performed with the image read-out means comprising (a) the read-out unit for irradiating the stimulating rays to the stimulable phosphor sheet in a one-dimensional direction along the main scanning direction and detecting the light, which is emitted by the stimulable phosphor sheet when the stimulating rays are irradiated to the stimulable phosphor sheet in the one-dimensional direction, and (b) the unit moving means for moving the read-out unit in the sub-scanning direction. In such cases, a space for the conveyance of the stimulable phosphor sheet and conveyance means are not necessary. Therefore, the size of the radiation image recording and read-out apparatus as a whole is capable of being minimized.

Further, the read-out unit may comprise the linear stimulating ray source, which linearly irradiates the stimulating rays to the area of the stimulable phosphor sheet, and the line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet. The linear stimulating ray source is capable of being formed to a size smaller than a point scanning type of light source, with which one light beam is deflected and caused to scan on the stimulable phosphor sheet. Also, the line sensor is smaller than a photomultiplier, or the like. Therefore, in such cases, the size of the readout unit as a whole is capable of being set to be small, and the size of the radiation image recording and read-out apparatus as a whole is consequently capable of being set to be small.

DESCRIPTION OF THE PREFERRED EMBODIMENTS

The present invention will hereinbelow be described in further detail with reference to the accompanying drawings.

Figure 1:
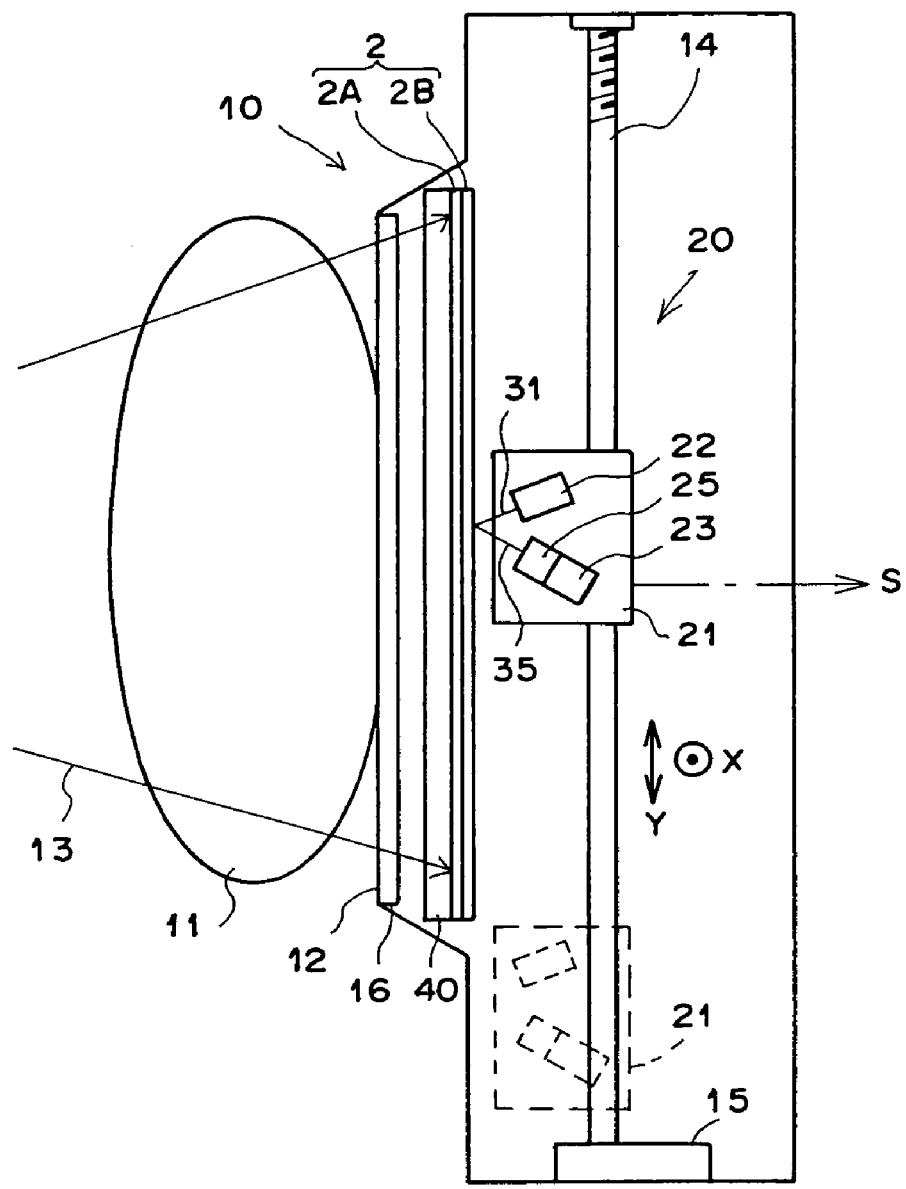
FIG. 1 is a schematic side view showing an embodiment of the radiation image recording and read-out apparatus in accordance with the present invention.

FIG. 1 is a schematic side view showing an embodiment of the radiation image recording and read-out apparatus in accordance with the present invention. As illustrated in FIG. 1, the radiation image recording and read-out apparatus comprises a radiation image recording section 10 and a radiation image read-out section 20.

The radiation image recording section 10 is provided with an object support base 12 for supporting an object 11, such as a human body, at a predetermined position. A grid 16 for removing scattered radiation is located on the side rearward from the object support base 12. Also, a stimulable phosphor sheet 2 is supported at a predetermined position for image recording and on the side rearward from the grid 16. The stimulable phosphor sheet 2 comprises a transparent substrate 2A and a stimulable phosphor layer 2B overlaid on the transparent substrate 2A. The object support base 12 has transmissivity to radiation. A sheet-shaped erasing light source 40 is located on the side of one surface of the stimulable phosphor sheet 2, which one surface is exposed to radiation 13, such that the sheet-shaped erasing light source 40 is in close contact with the stimulable phosphor sheet 2.

In the radiation image read-out section 20, a radiation image is read out with a read-out unit 21 from the stimulable phosphor sheet 2, on which the radiation image has been stored. The read-out unit 21 comprises a line light source (linear stimulating ray source) 22, a CCD line sensor 23, and a light collecting lens array 25, which is located on the side forward from the CCD line sensor 23 so as to stand facing the stimulable phosphor sheet 2. The read-out unit 21 is provided with a female thread region (not shown) for engagement with a ball screw 14, which extends vertically and is rotated by movement means 15. When the ball screw 14 is rotated forwardly and reversely, the read-out unit 21 is moved upwardly and downwardly by the ball screw 14.

Figure 2:
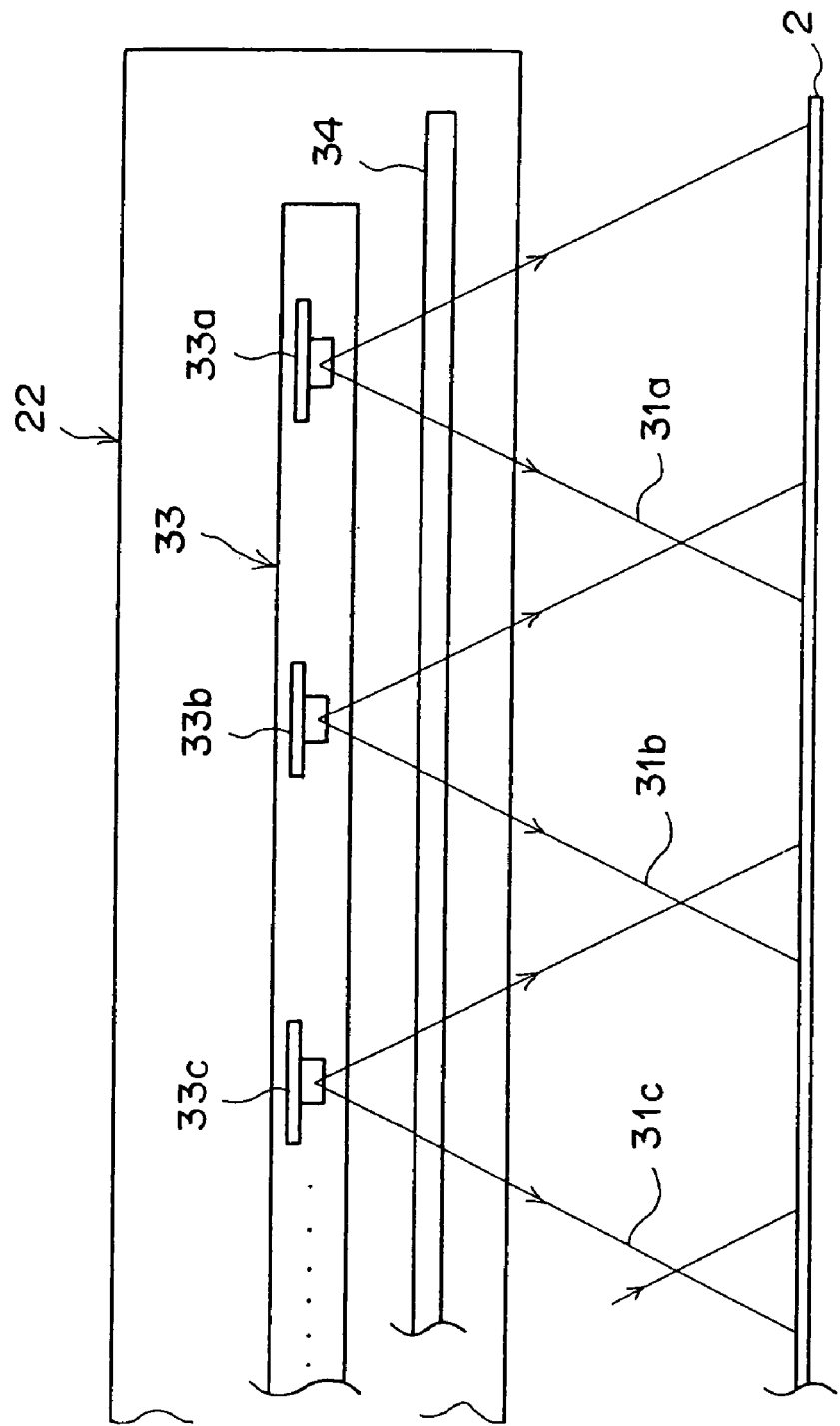
FIG. 2 is a front view showing a line light source employed in the embodiment of FIG. 1.

FIG. 2 is a front view showing the line light source 22. As illustrated in FIG. 2, the line light source 22 comprises a laser diode array 33 and a cylindrical lens 34. The laser diode array 33 comprises a plurality of laser diodes 33a, 33b, 33c, . . . arrayed in a line. By way of example, each of the laser diodes 33a, 33b, 33c, . . . produces a laser beam (the stimulating rays) having wavelengths falling within the range of 650 nm to 690 nm. The laser diodes 33a, 33b, 33c, . . . respectively produce stimulating rays 31a, 31b, 31c, . . . in a divergent light state. The stimulating rays 31a, 31b, 31c, . . . , which have been produced by the laser diodes 33a, 33b, 33c, . . . , are converged by the cylindrical lens 34 with respect to only one direction (only in the plane of the sheet of FIG. 1) and into fan beams. The stimulating rays 31, which are composed of the fan beams standing in a row, are linearly irradiated onto the linear area of the stimulable phosphor sheet 2.

Figure 3:
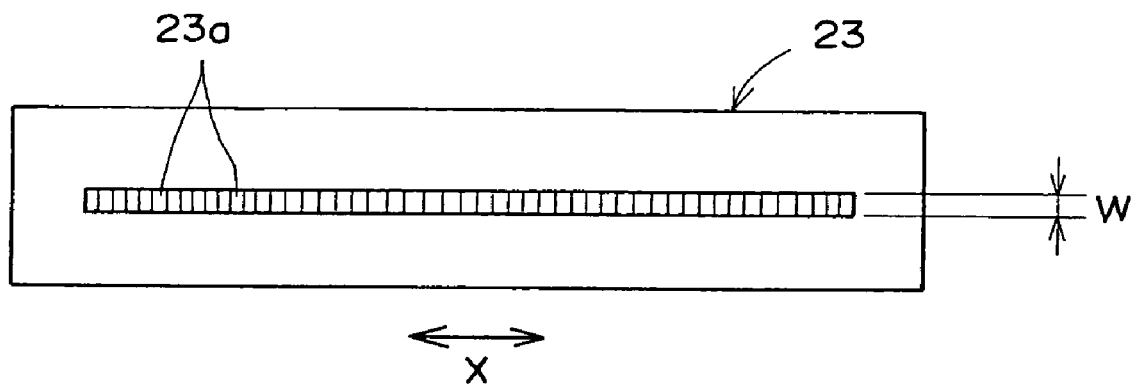
FIG. 3 is a plan view showing a line sensor employed in the embodiment of FIG. 1.

FIG. 3 is a plan view showing the CCD line sensor 23. As illustrated in FIG. 3, the CCD line sensor 23 comprises a plurality of sensor chips (photoelectric conversion devices) 23a, 23a, . . . , which are arrayed in a line. In this embodiment, a light receiving width of the CCD line sensor 23, which light receiving width is taken in the direction normal to the array direction of the sensor chips 23a, 23a, . . . , i.e. a width W of each of the sensor chips 23a, 23a, . . . , is approximately equal to 100 μM.

The CCD line sensor 23 is located in an orientation such that the sensor chips 23a, 23a, . . . stand side by side along a length direction of the linear area of the stimulable phosphor sheet 2 exposed to the linear stimulating rays 31 in FIG. 1 (i.e., along the main scanning direction indicated by the arrow X in FIG. 1). In cases where the stimulable phosphor sheet 2 has a large width, the CCD line sensor 23 may be composed of a plurality of line sensors, which are arrayed so as to stand in a row along the length direction of the CCD line sensor 23.

Figure 4:
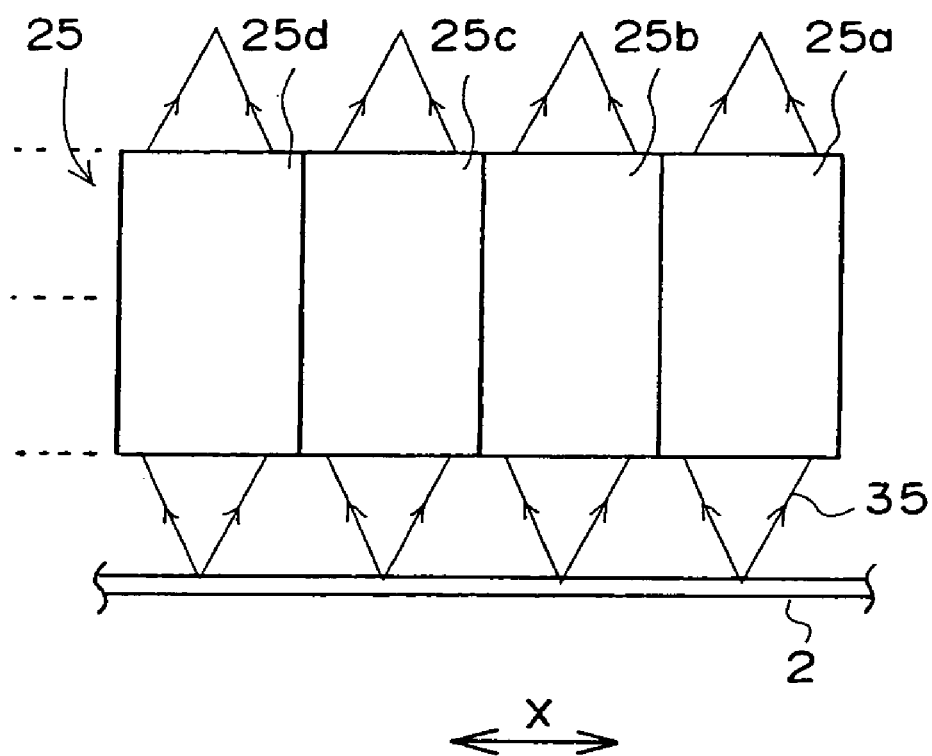
FIG. 4 is a front view showing a light collecting lens array employed in the embodiment of FIG. 1.

FIG. 4 is a front view showing the light collecting lens array 25, which is located on the side forward from the CCD line sensor 23. As illustrated in FIG. 4, the light collecting lens array 25 comprises, for example, a plurality of distributed index lenses 25a, 25b, 25c, 25d, . . . , which are arrayed in a line. The light collecting lens array 25 is located in an orientation such that the distributed index lenses 25a, 25b, 25c, 25d, . . . , stand side by side along the length direction of the linear area of the stimulable phosphor sheet 2 exposed to the linear stimulating rays 31, i.e. along the main scanning direction indicated by the arrow X in FIG. 1. Each of the distributed index lenses 25a, 25b, 25c, 25d, . . . collects light 35, which is emitted by the stimulable phosphor sheet 2. Also, as illustrated in FIG. 1, each of the distributed index lenses 25a, 25b, 25c, 25d, . . . guides the emitted light 35 toward the CCD line sensor 23.

Though not shown, a filter for filtering out the stimulating rays 31, which have been reflected from the stimulable phosphor sheet 2, is located between the CCD line sensor 23 and the light collecting lens array 25.

The sheet-shaped erasing light source 40 produces the erasing light, which has wavelengths falling within a stimulation wavelength region for the stimulable phosphor sheet 2. The sheet-shaped erasing light source 40 has uniform transmissivity to the radiation 13. Also, the sheet-shaped erasing light source 40 has a size at least identical with the size of the stimulable phosphor sheet 2 and irradiates the erasing light simultaneously to the entire area of the stimulable phosphor sheet 2. After the radiation image has been read out from the stimulable phosphor sheet 2, the erasing light is irradiated to the stimulable phosphor sheet 2, and energy remaining on the stimulable phosphor sheet 2 is thereby released from the stimulable phosphor sheet 2.

Specifically, the sheet-shaped erasing light source 40 comprises an organic electroluminescence device. The sheet-shaped erasing light source 40 has a sufficient transmissivity to the radiation 13 and is substantially free from a structure, which is discontinuous with respect to the transmissivity to the radiation 13. Therefore, when the radiation 13 passes through the sheet-shaped erasing light source 40 and is irradiated to the stimulable phosphor sheet 2, and the radiation image of the object 11 is thereby recorded on the stimulable phosphor sheet 2, no image pattern of the sheet-shaped erasing light source 40 is simultaneously recorded on the stimulable phosphor sheet 2.

Figure 5:
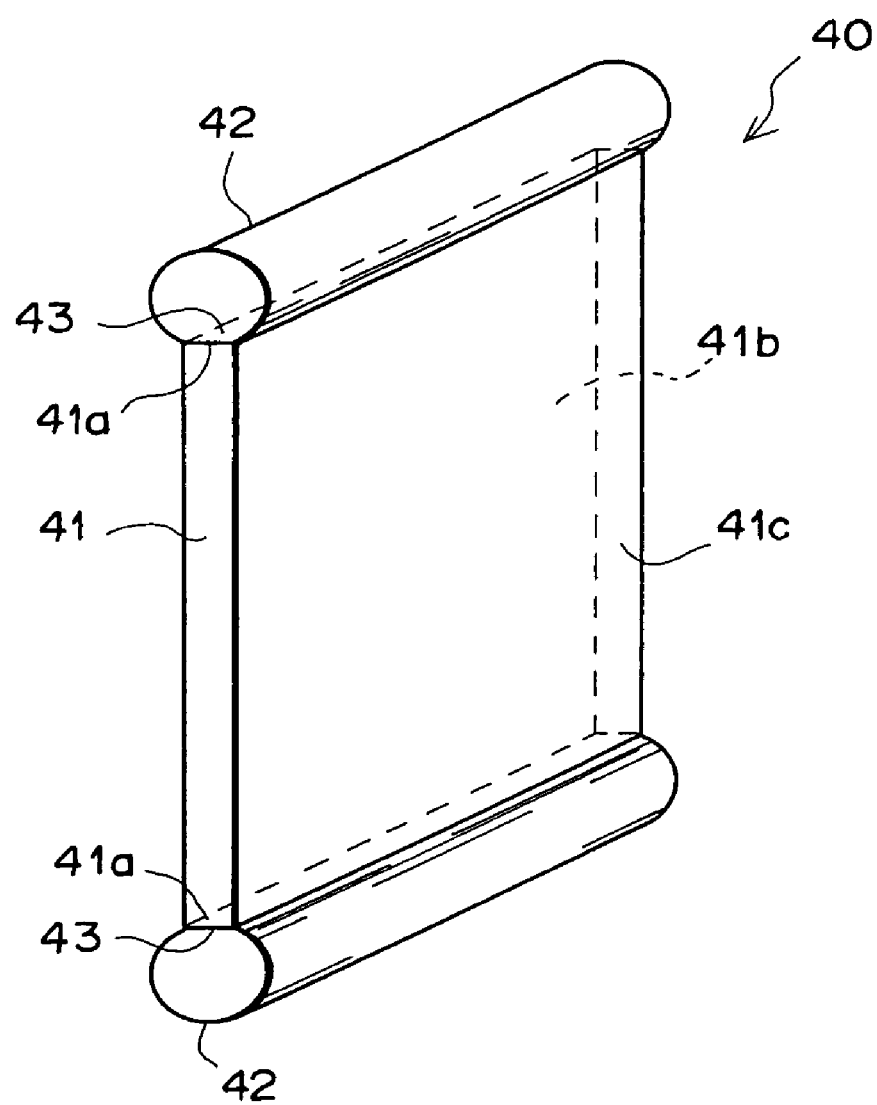
FIG. 5 is a perspective view showing a different example of an erasing light source employed in the radiation image recording and read-out apparatus in accordance with the present invention.
Figure 6:
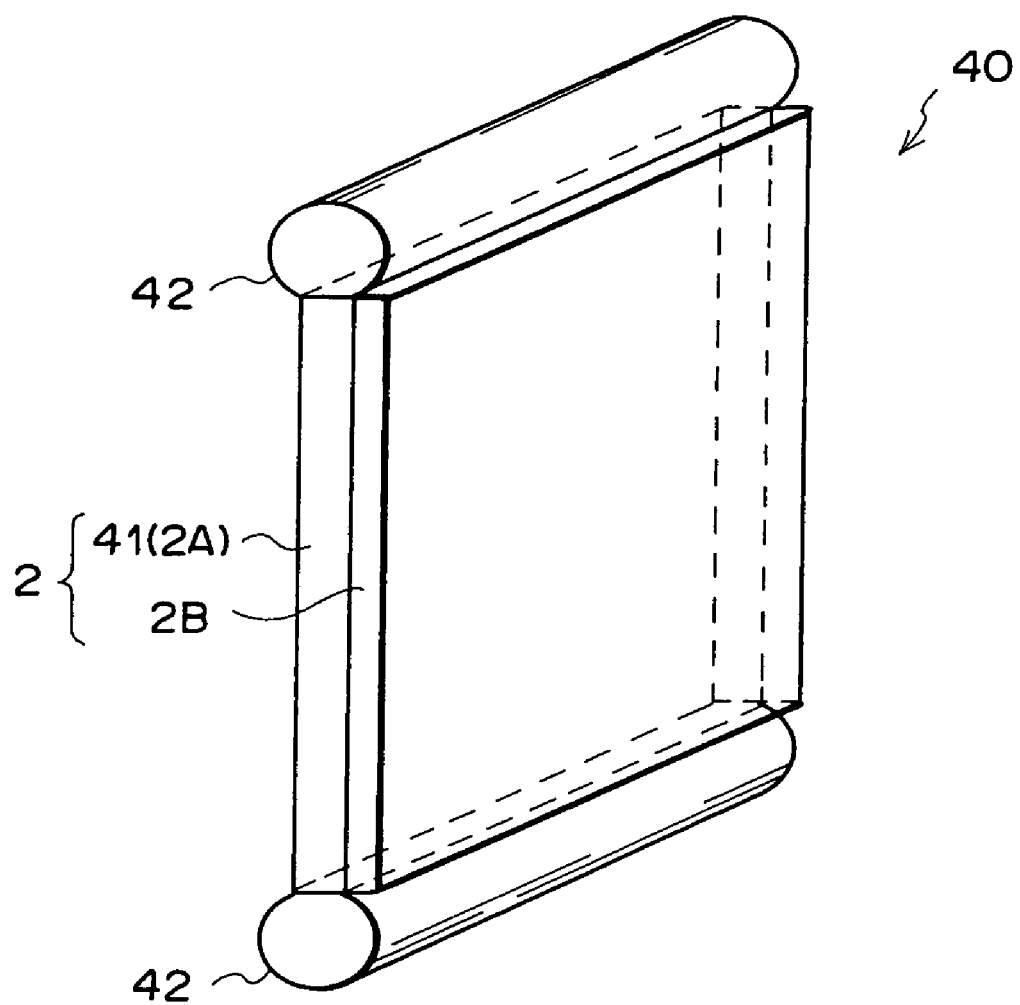
FIG. 6 is a perspective view showing a further different example of an erasing light source employed in the radiation image recording and read-out apparatus in accordance with the present invention.

In the radiation image recording and read-out apparatus in accordance with the present invention, in lieu of the sheet-shaped erasing light source 40, a sheet-shaped erasing light source 40' shown in FIG. 5 or a sheet-shaped erasing light source 40" shown in FIG. 6 may be employed.

The sheet-shaped erasing light source 40' shown in FIG. 5 comprises a transparent sheet 41, which may be made from an acrylic resin, or the like. The sheet-shaped erasing light source 40' also comprises aperture types of fluorescent lamps 42, 42, each of which is located at one of two ends 41a, 41a of the transparent sheet 41. Each of the fluorescent lamps 42, 42 has an aperture 43. The aperture 43 of each of the fluorescent lamps 42, 42 is in contact with the corresponding end 41a of the transparent sheet 41. The erasing light enters from the apertures 43, 43 of the fluorescent lamps 42, 42 into the transparent sheet 41. A radiation incidence surface 41b of the transparent sheet 41 is formed as a light diffusing surface. The light diffusing surface acts such that the erasing light is efficiently radiated out from a surface 41c, which stands facing the stimulable phosphor sheet 2. However, it is sufficient for the transparent sheet 41 to have light diffusing properties and to be capable of radiating out the erasing light from the surface 41c, which stands facing the stimulable phosphor sheet 2. Therefore, the radiation incidence surface 41b of the transparent sheet 41 need not necessarily be formed as the light diffusing surface. For example, instead of the radiation incidence surface 41b of the transparent sheet 41 being formed as the light diffusing surface, the surface 41c, which stands facing the stimulable phosphor sheet 2, may be formed as the light diffusing surface. As another alternative, the transparent sheet 41 may contain light diffusing particles dispersed in the transparent sheet 41. In lieu of the aperture types of the fluorescent lamps 42, 42, cold cathode fluorescent lamps, and the like, may be employed.

Also, as illustrated in FIG. 6, the stimulable phosphor layer 2B may be overlaid on the transparent sheet 41 of the sheet-shaped erasing light source 40″, and the transparent sheet 41 may acts also as the transparent substrate 2A of the stimulable phosphor sheet 2. Specifically, in the example of FIG. 6, the sheet-shaped erasing light source 40 and the stimulable phosphor sheet 2 are combined into an integral body.

How the aforesaid embodiment of the radiation image read-out apparatus in accordance with the present invention operates will be described hereinbelow.

When an operation for recording the radiation image of the object 11 on the stimulable phosphor sheet 2 is to be performed, the object 11 lies at the aforesaid predetermined position on the object support base 12. The radiation 13, such as X-rays, is then produced by a radiation source (not shown) and irradiated to the object 11. The radiation 13 carrying image information of the object 11 impinges upon the stimulable phosphor sheet 2. In this manner, the radiation image of the object 11 is recorded (i.e., stored) on the stimulable phosphor sheet 2.

At the time at which the image recording operation for recording the radiation image of the object 11 on the stimulable phosphor sheet 2 is performed, the read-out unit 21 is set at the waiting position indicated by the broken lines in FIG. 1. When the image recording operation has been finished, the read-out unit 21 is moved upwardly at a predetermined speed. At this time, the laser diode array 33 of the line light source 22 is activated to produce the stimulating rays 31, and the fan beam-like stimulating rays 31 are linearly irradiated to the linear area of the stimulable phosphor sheet 2, which linear area extends in the main scanning direction indicated by the arrow X. Also, the read-out unit 21 is moved in the sub-scanning direction indicated by the arrow Y, which sub-scanning direction is normal to the main scanning direction indicated by the arrow X. As a result, the stimulable phosphor sheet 2 is scanned with the stimulating rays 31 in two-dimensional directions.

When the stimulating rays 31 are linearly irradiated to the area of the stimulable phosphor sheet 2, the linear area of the stimulable phosphor sheet 2 exposed to the linear stimulating rays 31 emits the light 35 having intensity in accordance with the radiation image having been stored on the stimulable phosphor sheet 2. The emitted light 35 is collected by the light collecting lens array 25, impinges upon the CCD line sensor 23, and is received by the CCD line sensor 23.

The CCD line sensor 23 photoelectrically detects the emitted light 35 and feeds out a light detection signal. The light detection signal is fed into a read-out circuit (not shown) and subjected to amplification and analog-to-digital conversion. A read-out image signal S, which has thus been obtained, is fed out from the radiation image recording and read-out apparatus. When necessary, the read-out image signal S is subjected to processing, such as gradation processing and processing in the frequency domain. The read-out image signal S is then fed into image displaying means, such as a CRT display device, or an image recording apparatus, such as a light scanning recording apparatus, and is utilized for reproducing the image represented by the read-out image signal S, i.e. the radiation image having been stored on the stimulable phosphor sheet 2.

When the read-out unit 21 is moved to a sub-scanning end position and the image read-out operation is finished, the read-out unit 21 is moved downwardly toward the waiting position described above.

Thereafter, the sheet-shaped erasing light source 40 is activated to produce the erasing light. The erasing light, which has been produced by the sheet-shaped erasing light source 40, is irradiated uniformly to the entire area of the stimulable phosphor sheet 2. When the stimulable phosphor sheet 2 is exposed to the erasing light having wavelengths falling within the stimulation wavelength region for the stimulable phosphor sheet 2, energy remaining on the stimulable phosphor layer 2B of the stimulable phosphor sheet 2 is released. Therefore, the stimulable phosphor sheet 2 is capable of being again utilized for the recording of a radiation image.

After the read-out unit 21 has been returned to the waiting position described above, the radiation 13 carrying the image information of the object 11 may be irradiated to the stimulable phosphor sheet 2. In this manner, the radiation image of the object 11 is capable of being stored on the stimulable phosphor sheet 2.

As described above, with the aforesaid embodiment of the radiation image recording and read-out apparatus in accordance with the present invention, the erasing light source 40 has the sheet-like shape and is located on the side of the one surface of the stimulable phosphor sheet 2, which one surface is exposed to the radiation 13, such that the sheet-shaped erasing light source 40 is in close contact with the stimulable phosphor sheet 2. Therefore, the sheet-shaped erasing light source 40 is thin and has a small size, and a space for movement of the erasing light is not necessary. Accordingly, the size of the radiation image recording and read-out apparatus as a whole is capable of being kept small.

In lieu of the laser diode array 33, the line light source 22 may comprise a light emitting diode (LED) array.

In the embodiment described above, the stimulable phosphor sheet 2 is kept stationary at the position for image recording, and the radiation image is read out from the stimulable phosphor sheet 2 while the stimulable phosphor sheet 2 is being kept in this state. Alternatively, after the radiation image has been recorded on the stimulable phosphor sheet 2 at the position for image recording, the stimulable phosphor sheet 2 may be moved to a predetermined position for image readout, and the radiation image may be read out from the stimulable phosphor sheet 2 at the position for image readout.

Also, in the embodiment described above, the radiation image read-out section 20 is provided with the read-out unit 21, which comprises the line light source 22 and the CCD line sensor 23. Alternatively, a read-out unit may be employed, which comprises point scanning means and photoelectric conversion means constituted of a photomultiplier sensor.

In the aforesaid embodiment of the radiation image read-out apparatus in accordance with the present invention, the stimulable phosphor sheet for storing the radiation image may be an ordinary stimulable phosphor sheet having both the functions for absorbing radiation and the functions for storing energy from the radiation. Alternatively, the stimulable phosphor sheet may be a stimulable phosphor sheet proposed in, for example, Japanese Patent Application No. 11(1999)-372978. Such that the functions for absorbing radiation and the functions for storing energy from the radiation may be separated from each other, the proposed stimulable phosphor sheet contains a layer of a phosphor for radiation absorption, which is capable of absorbing radiation and being caused to emit light having wavelengths falling within an ultraviolet to visible region, and a layer of a stimulable phosphor for energy storage, which is capable of absorbing light having wavelengths falling within the ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light. As another alternative, the stimulable phosphor sheet may be one of various other kinds of stimulable phosphor sheets.

What is claimed is:

1. A radiation image recording and read-out method, comprising the steps of:
   i) supporting a stimulable phosphor sheet at a position for image recording, at which one surface of the stimulable phosphor sheet is exposed to radiation,
   ii) exposing the one surface of the stimulable phosphor sheet, which is supported at the position for image recording, to the radiation, a radiation image being thereby stored on the stimulable phosphor sheet,
   iii) performing an image read-out operation from a side of the other surface of the stimulable phosphor sheet supported at the position for image recording, which other surface is opposite to the one surface of the stimulable phosphor sheet exposed to the radiation, the image read-out operation being performed by irradiating stimulating rays in two-dimensional directions to the stimulable phosphor sheet as the sheet is held in a substantially stationary position, on which the radiation image has been stored during its exposure to the radiation, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and
   iv) releasing energy, which remains on the stimulable phosphor sheet after the image signal has been obtained from the stimulable phosphor sheet, by irradiating erasing light to an entire area of the stimulable phosphor sheet with a sheet-shaped erasing light source, the sheet-shaped erasing light source being located in close vicinity to the stimulable phosphor sheet and on a side of the one surface of the stimulable phosphor sheet supported at the position for image recording, which one surface is exposed to the radiation, the sheet-shaped erasing light source having uniform transmissivity to the radiation, wherein the stimulable phosphor sheet comprises a sheet-shaped transparent substrate and a stimulable phosphor layer,
   the sheet-shaped erasing light source is arranged on one side of the sheet-shaped transparent substrate, and the stimulable phosphor layer is arrange on another side, which is opposite to the one side, of the sheet-shaped transparent substrate, and
   the stimulating rays for the image read-out irradiate the stimulable phosphor layer at the side opposite to the side exposed to the radiation.

2. A method as defined in claim 1 wherein the sheet-shaped erasing light source comprises an organic electroluminescence device.

3. A method as defined in claim 1 wherein the sheet-shaped erasing light source comprises a transparent sheet, which has light diffusing properties, the transparent sheet being capable of radiating out the erasing light from a surface, which stands facing the stimulable phosphor sheet, toward the stimulable phosphor sheet, and
   light sources, each of which is located at one of two ends of the transparent sheet and produces the erasing light such that the erasing light enters from the one end of the transparent sheet into the transparent sheet.

4. A method as defined in claim 3 wherein at least either one of two surfaces of the transparent sheet is formed as a light diffusing surface.

5. A method as defined in claim 3 wherein the transparent sheet contains light diffusing particles dispersed therein.

6. A method as defined in claim 1, 2, 3, 4, or 5 wherein the stimulable phosphor sheet is kept stationary at the position for image recording, and
   the image read-out operation is performed with a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, the read-out unit being moved in a sub-scanning direction.

7. A method as defined in claim 6 wherein the read-out unit comprises a linear stimulating ray source, which linearly irradiates the stimulating rays to an area of the stimulable phosphor sheet, and
   a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

8. The method as defined in claim 1, wherein the stimulable phosphor sheet is maintained at said position during said performing of the read-out operation and said irradiating of the erasing light source.

9. The method as defined in claim 1, wherein the erasing light is sufficient to erase substantially all of the energy which remains on the stimulable phosphor sheet after said performing of the read-out operation.

10. A radiation image recording and read-out apparatus, comprising:
    i) an image recording section for supporting a stimulable phosphor sheet at a position for image recording, at which one surface of the stimulable phosphor sheet is exposed to radiation,
    ii) image read-out means located on a side of the other surface of the stimulable phosphor sheet supported at the position for image recording, which other surface is opposite to the one surface of the stimulable phosphor sheet exposed to the radiation, the image read-out means performing an image read-out operation by irradiating stimulating rays in two-dimensional directions to the stimulable phosphor sheet as the sheet is being held in a substantially stationary position, on which a radiation image has been stored during its exposure to the radiation, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and iii) a sheet-shaped erasing light source located in close vicinity to the stimulable phosphor sheet and on a side of the one surface of the stimulable phosphor sheet supported at the position for image recording, which one surface is exposed to the radiation, the sheet-shaped erasing light source having uniform transmissivity to the radiation, the sheet-shaped erasing light source releasing energy, which remains on the stimulable phosphor sheet after the image signal has been obtained from the stimulable phosphor sheet, by irradiating erasing light to an entire area of the stimulable phosphor sheet, wherein the stimulable phosphor sheet comprises a sheet-shaped transparent substrate and a stimulable phosphor layer, the sheet-shaped erasing light source is arranged on one side of the sheet-shaped transparent substrate, and the stimulable phosphor layer is arrange on another side, which is opposite to the one side, of the sheet-shaped transparent substrate, and the stimulating rays for the image read-out irradiate the stimulable phosphor layer at the side opposite to the side exposed to the radiation.

11. An apparatus as defined in claim 10 wherein the sheet-shaped erasing light source comprises an organic electroluminescence device.

12. An apparatus as defined in claim 10 wherein the sheet-shaped erasing light source comprises a transparent sheet, which has light diffusing properties, the transparent sheet being capable of radiating out the erasing light from a surface, which stands facing the stimulable phosphor sheet, toward the stimulable phosphor sheet, and light sources, each of which is located at one of two ends of the transparent sheet and produces the erasing light such that the erasing light enters from the one end of the transparent sheet into the transparent sheet.

13. An apparatus as defined in claim 12 wherein at least either one of two surfaces of the transparent sheet is formed as a light diffusing surface.

14. An apparatus as defined in claim 12 wherein the transparent sheet contains light diffusing particles dispersed therein.

15. An apparatus as defined in claim 10, 11, 12, 13, or 14 wherein the stimulable phosphor sheet is kept stationary at the position for image recording, and the image read-out means comprises:

a) a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, and b) unit moving means for moving the read-out unit in a sub-scanning direction.

16. An apparatus as defined in claim 15 wherein the read-out unit comprises a linear stimulating ray source, which linearly irradiates the stimulating rays to an area of the stimulable phosphor sheet, and a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

17. The apparatus as defined in claim 10, wherein the stimulable phosphor sheet is maintained at said position during operation of the read-out means and the erasing light source.

18. The apparatus as defined in claim 10, wherein the wherein the erasing light is sufficient to erase substantially all of said energy which remains on the stimulable phosphor sheet after the image signal has been obtained from the stimulable phosphor sheet.

* * * * *